US008134498B2

(12) United States Patent
Fernandez et al.

(10) Patent No.: US 8,134,498 B2
(45) Date of Patent: Mar. 13, 2012

(54) NAVIGATION-SATELLITE TRACKING METHOD AND RECEIVING STATION

(75) Inventors: Francisco Amarillo Fernandez, Madrid (ES); Gustavo López-Risueño, Leiden (NL)

(73) Assignee: European Space Agency, Paris (FR)

( * ) Notice: Subject to any disclaimer, the term of this patent is extended or adjusted under 35 U.S.C. 154(b) by 246 days.

(21) Appl. No.: 12/580,173

(22) Filed: Oct. 15, 2009

(65) Prior Publication Data

US 2010/0171653 A1 Jul. 8, 2010

(30) Foreign Application Priority Data

Oct. 17, 2008 (EP) .................................... 08166875

(51) Int. Cl.
*G01S 19/42* (2010.01)
(52) U.S. Cl. .................................. 342/357.25
(58) Field of Classification Search .............. 342/357.25
See application file for complete search history.

(56) References Cited

U.S. PATENT DOCUMENTS

| 6,018,315 | A | 1/2000 | Ince et al. | |
|---|---|---|---|---|
| 6,828,935 | B1 | 12/2004 | Dunn et al. | |
| 2002/0169578 | A1 | 11/2002 | Yang | |
| 2004/0263421 | A1* | 12/2004 | Schaffner et al. | 343/911 L |

FOREIGN PATENT DOCUMENTS

| EP | 1 553 424 A1 | 7/2005 |
|---|---|---|
| JP | 2001 311767 A | 11/2001 |
| JP | 2007 155483 | 6/2007 |

OTHER PUBLICATIONS

Gonzalo Seco-Granados et al: "ML Estimator and Hybrid Beamformer for Multipath and Interference Mitigation in GNSS Receivers," IEEE Transactions on Signal Processing, vol. 53, No. 3, Mar. 2005, pp. 1194-1208.
Application No. EP 08 16 6875; European Search Report completed Feb. 4, 2009, 3 pages.
Bradford W. Parkinson et al., "Global Positioning System: Theory and Applications," vol. I, 1996. Table of Contents, pp. ix-xviii; Chapter 7, pp. 245-327; Chapter 9, pp. 409-433.

* cited by examiner

*Primary Examiner* — Harry Liu
(74) *Attorney, Agent, or Firm* — Blakely Sokoloff Taylor & Zafman LLP (57) ABSTRACT

A navigation-satellite tracking method includes determining one-way range unambiguous observations for each of a set of satellites in view, wherein standard tracking channels are permanently associated to each of the satellites. Determining the one-way range unambiguous observations may include determining one-way range unambiguous and one-way range ambiguous observations with a nearly-hemispherical antenna at a measurement time $t_A$ for each satellite out of the set of satellites in view simultaneously; sequentially determining an additional one-way range unambiguous observation and an additional one-way range ambiguous observation with at respectively different further measurement times $t_A + k\Delta t$; and transforming, satellite per satellite, the additional one-way range unambiguous observations in one-way range unambiguous observations referred to a common future time, wherein this transformation is achieved by adding to each of the one-way range unambiguous observations the temporal evolution of the one-way range ambiguous observations of the respective satellite.

8 Claims, 9 Drawing Sheets

NAVIGATION-SATELLITE TRACKING METHOD AND RECEIVING STATION

1. FIELD OF THE INVENTION

The invention relates to a satellite navigation tracking method comprising the observation of pseudorange of a receiving station and a receiving station suitable for implementing this method.

2. BACKGROUND OF THE INVENTION

The invention relates to tracking techniques in satellite radio-navigation. Conventional radio navigation systems make use of simultaneous observations to all satellites in view over the local horizon. In order to unambiguously determine the four-dimensional position including the three geographical coordinates and the time, simultaneous "one-way range unambiguous" observations to at least four satellites in view plus the knowledge of the precise positions of these satellites is necessary.

These techniques are also referred to as "one-way range unambiguous" observation techniques and are described in the standard literature (e.g. "Global Positioning System: Theory and applications", Vol. 1, American Institute of Aeronautics and Astronautics, 1996, edited by B. P. Parkinson and J. J. Spilker). The nature of the "one-way range unambiguous" observation makes it sensitive to any misalignment between the transmitter's and the receiver's clocks. As the transmitter's clock offset with respect to a reference time scale is accurately known, in a first approximation, the "one-way range unambiguous observation" depends only on the user-to-satellite range and on the receiver's-clock-offset with respect to the reference time scale. In conventional satellite radio-navigation the transmitter is on-board the satellite and the receiver is on-ground.

In addition, in order to reduce the noise of the "one-way range unambiguous" observations, it is known to additionally process "one-way range ambiguous" observations (e.g in professional applications) which is possible thanks to the much superior accuracy of the second type of observations (e.g. the "Carrier-Smoothing Method" discussed in the above-mentioned reference of Parkinson).

In satellite navigation, the most frequently used "one-way range" observations are the "pseudorange" and the "carrier phase" observations corresponding to a "one-way range unambiguous" observation and to a "one-way range ambiguous" observation respectively. Any "pseudorange" observable is visibly affected by multipath and interference if the "pseudoranges" to all the satellites in view over the local horizon are synchronously obtained (simultaneously) by a ground equipment with one common non-directional antenna.

If instead sequential "pseudorange" observations are obtained then all equipment resources can be focused on one single satellite, and an antenna with a much higher directivity can be used. The resulting sequential observations are much less affected by multipath and by interference, and preserved accurately the geometrical information as far as the stability of the antenna phase response is ensured.

However whereas for a set of synchronous "one-way range" observations all observations are affected by common errors and refer to the same receiver positions, for sequential "one-way range" observations errors are not common and the observations refer potentially to different positions (since the receiving station may move between the observations).

Since the positioning errors due to multipath and interference perturbations have been considered compatible with the past needs, tracking techniques (providing sequential "pseudoranges") using antenna with higher directivity have been widely disregarded in satellite navigation in the past.

3. SUMMARY OF THE INVENTION

It is an object of the invention to combine the advantages of satellite navigation tracking-methods using simultaneous observations and of tracking-methods using sequential observations while avoiding the drawbacks of the respective type of method. It is a further object of the invention to provide a satellite navigation tracking method with enhanced precision.

The above objects are achieved by a navigation satellite tracking method and by a receiving station according to the independent claims.

The invention requires first one conventional estimation of the receiver position and time. This conventional estimation comprises the steps of determining the pseudoranges to at least four of the visible satellites at a common observation time and calculating the receiver position and time knowing the pseudo-ranges to the satellites and the positions of these satellites.

According to an important aspect of the invention, it is proposed that, after initialization, the step of determining the pseudorange to a satellite includes additional steps consisting in determining another pseudorange to the satellite at a measurement time differing from the common observation time and correcting the thus determined asynchronous pseudorange in order to account for the difference between the measurement time and the common observations time based on the temporal evolution of the carrier phase to the same satellite. In other words, the method transforms the result of an asynchronous "one-way range unambiguous" observation to a satellite by using "one-way range ambiguous" observations to the same satellite into an equivalent synchronous "one-way unambiguous" observation. The above process is applied for all satellites over the horizon of the receiving station.

The asynchronous and sequential observations to the satellites imply that for each observation there is potentially a different receiver position and velocity, a different receiver clock offset and receiver clock drift, a different zenith tropospheric error and zenith tropospheric error temporal-gradient and a different ionospheric error and ionospheric error temporal-gradient. The transformation into the equivalent set of synchronous observations accounts for the above errors up to the first order, such that the transformed observations refer to exactly the same receiver position and velocity, receiver clock offset and receiver clock drift, tropospheric error and tropospheric error temporal-gradient. The invention is based on the fact that the above effects can be captured using carrier phase observations and can be accounted for by performing a suitable correction based on the temporal evolution of the carrier phase.

The method according to the invention mitigates both the low and high-correlated components of the multipath-induced tracking error and of the interference-induced tracking error by means of a focussed beam. Moreover, the invention does not require a long integration time and can be combined with the "Carrier-Smoothing Method" in order to further reduce the effects of multipath and interference.

Thus according to further embodiments of the invention, it is proposed that the step of determining the additional asynchronous pseudorange to a satellite is executed using a directional antenna and additional aided-tracking loop. By employing the directional antenna, the advantages of the asynchronous observations can be fully exploited, by focusing sequentially all hardware resources in the tracking of a single satellite. The carrier phase tracking can be performed in an easy and cost-saving way for multiple satellites if the carrier phases are continuously tracked using a standard non-directional antenna. Accordingly, the system implementing the proposed satellite navigation tracking method comprises conceptually two independent antenna subsystems, i.e. one directional antenna subsystem and one non-directional antenna subsystem, and two receiver processing units (interconnected), one for sequential tracking and another one for continuous tracking.

In a preferred embodiment of the invention, the step of correcting an additional asynchronous pseudorange to the observed satellite includes determining the difference between the values of the carrier phase at the measuring time and of the carrier phase at the common observation time. A quantity proportional to this difference is added to the asynchronous pseudorange, to the same satellite, at the measuring time, in order to obtain an estimate of the pseudorange to the satellite at the common observation time. Since the temporal evolution of the carrier phase follows the temporal evolution of the navigation signal propagation time, the errors due to the movement of the receiving station as well as most of the remaining time dependent errors (explicitly mentioned before) can be compensated in an easy way.

The step of determining the asynchronous sequential pseudorange to a satellite at the measurement time includes generating an ionosphere error-free value of the pseudorange to the satellite using at least two navigation signals transmitted on different carrier frequencies. A similar method for ionosphere-correction may be performed with regard to the carrier phase wherein the carrier phases from at least two different navigation signals transmitted using different carrier frequencies are combined in order to correct ionospheric errors.

Moreover, the invention relates to a receiving station for use in a satellite navigation system suitable for executing the method of the invention.

5. DETAILED DESCRIPTION OF THE EMBODIMENTS

Figure 1:
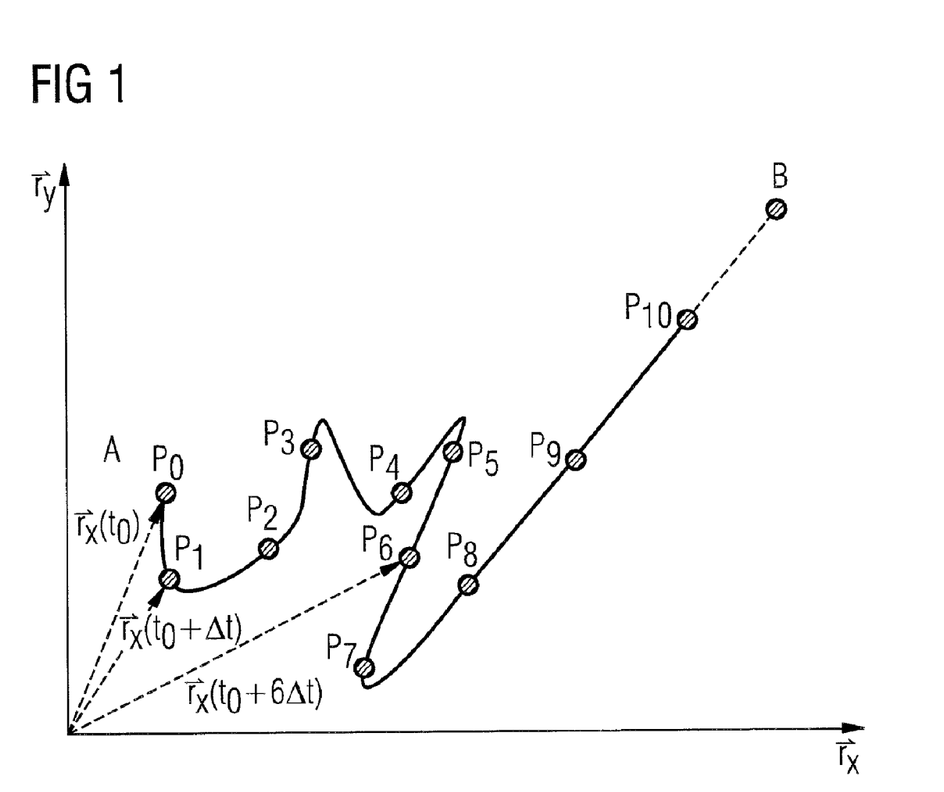
FIG. 1 shows a schematic example of a user trajectory starting from a point A and ending on a point B.

FIG. 1 is a schematic representation of a user trajectory $\vec{r}(t)$, in which a user with a receiving station moves from a point A to a point B. The points A and B represent the user positions at two observation times "$t_a$" and "$t_b$". In standard tracking techniques the receiving station obtains for each satellite in view and at each observation time $t_a$, , , , the standard pseudorange $p_A^i(f_1)$ from the user position at time $t_a$ (point A) to satellite "i" based on the navigation signals received from this satellite modulated on a specific carrier $f_1$. Similar pseudoranges $p_A^i(f_j)$ are obtained for the further frequencies $f_j=f_2 \ldots f_n$. In order to unambiguously determine the spatio-temporal position of the receiving station, the pseudoranges $p_A^i(f_j)$ to a number of satellites i=1 . . . 4 over the user horizon have to be measured.

Besides the above-defined pseudorange observations, the receiving station determines standard carrier phases $\phi_A^i(f_j)$ for each satellite and for each frequency $f_1$ to $f_n$, at two observation times "$t_a$", . . . . In a standard observation, the carrier phases are measured simultaneously for each satellite.

Here and in the following, the time span between consecutive observation times $t_a$, $t_b$, $t_c$ is assumed to be constant and therefore the above-described standard observations are performed periodically. The thus determined pseudoranges $p_A^i(f_j)$ may have important error contributions resulting from multipath and interference since the simultaneous measurement of all the satellites over the horizon requires to use a low directional antenna with a hemispherical radiation pattern.

One of the characterizing features of the invention is to provide additional observations at intermediate times when the user is located at the points $P_1 \ldots P_{10}$ represented by dots in FIG. 1. At times $t_k=t_a+k\Delta t$, wherein k is a non-negative natural number greater than zero, additional observations are performed, the results of which will be referred to as the "delta pseudorange" $p_{P_k}^{i_k}(f_j)$ for the different points $P_k=P_1 \ldots P_{10}$ in the following. In the present embodiment of the invention, for each time $t_j=t_a+k\Delta t$, only one pseudorange observation $p_{P_k}^{i_k}(f_j)$ is obtained at each point $P_1 \ldots P_{10}$ in FIG. 1, and the satellite it refers to is different for each $t_k$. The concept can be extended to other embodiments in which observations to a subset of satellites (with more than one satellite and less than all in view satellites) obtained simultaneously being each satellite signal received by a dedicated antenna beam.

These delta pseudoranges $p_{P_k}^{i_k}(f_j)$ are determined for each ranging signal modulated on each carrier frequency $f_j$ transmitted by the satellites. These carrier frequencies $f_j$ may correspond to the carrier frequencies used by the standard observations.

The receiving station tracks the carrier phases of the navigation signals for each frequency and for each satellite over the horizon, being the carrier phases stored at each time $t_a+k\Delta t$, for each value of k, for each frequency $f_1$ to $f_n$ and for each satellite in view.

Similar to the standard procedure the additional pseudorange observations $p_{P_k}{}^{ik}(f_j)$ gathered at the same time and referring to the same satellite but to different frequencies are transformed into a single ionosphere-free pseudorange observable $p_{P_k}{}^{ik}(iof)$.

In a similar way, the carrier phase observations $\phi_{P_k}{}^{ik}(f_j)$ gathered at the measurement time $t_j=t_a+k\Delta t$ for the frequencies $f_j$ are transformed into a single ionosphere-free additional carrier phase observable $\phi_{P_k}{}^{ik}(iof)$.

Figure 2:
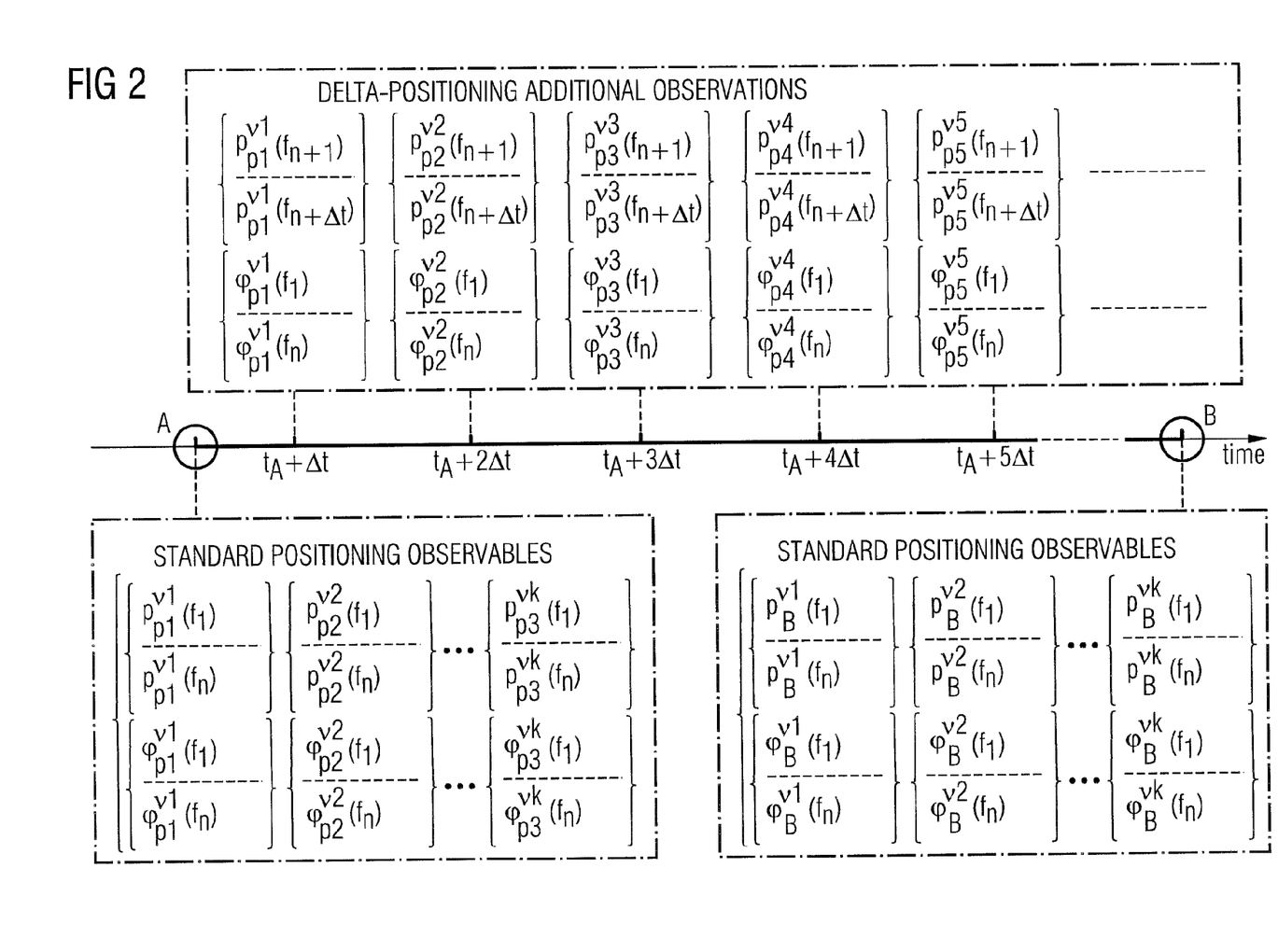
FIG. 2 is a time bar illustrating which of observables are measured at which time.

FIG. 2 is a schematic representation showing a time bar and illustrating at which times which observables are taken.

Figure 3:
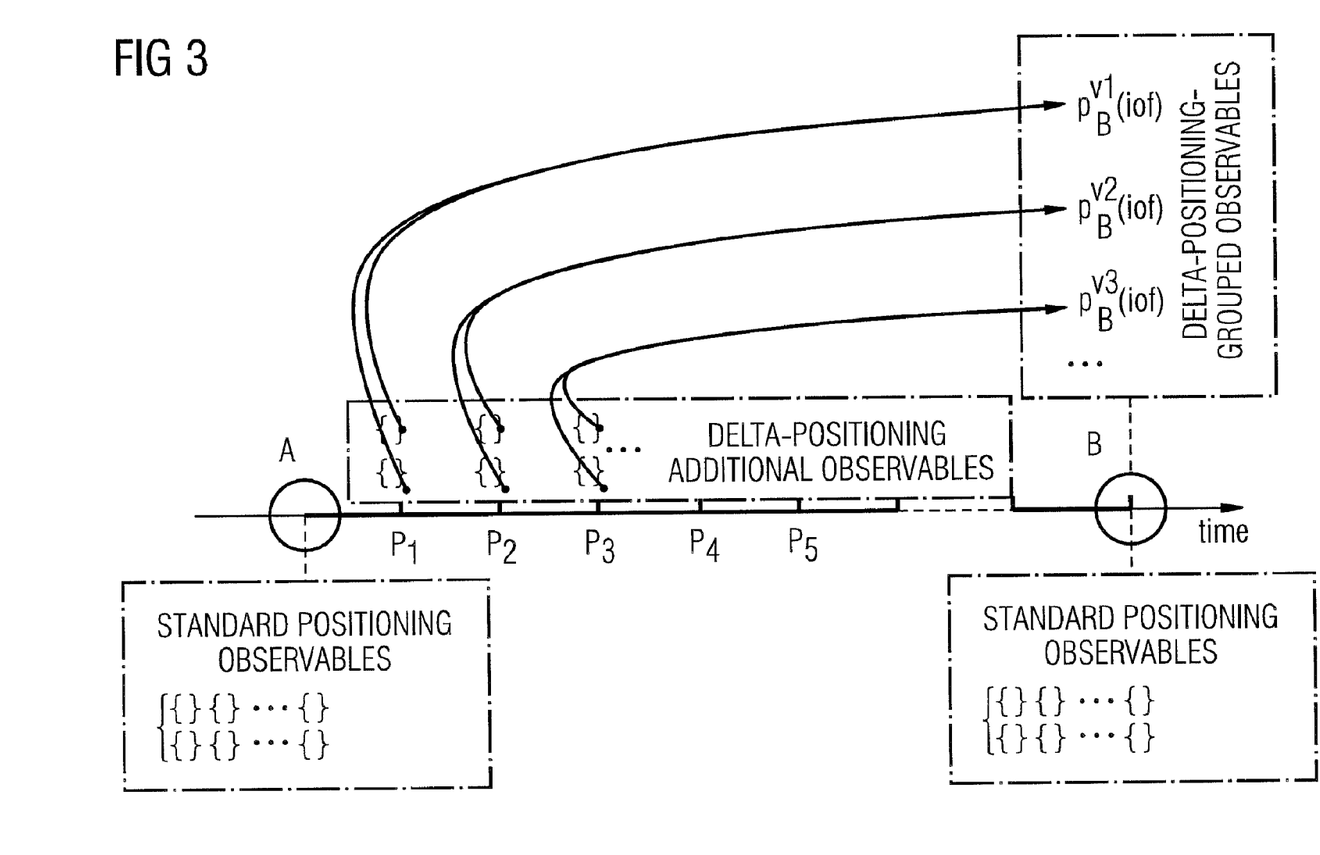
FIG. 3 is a schematic representation of the correction method for the asynchronous and sequential observables

The procedure described in the following seeks to correct the distances represented by the ionosphere-free additional asynchronous sequential pseudorange observations $p_{P_k}{}^{ik}(iof)$, $\phi_{P_k}{}^{ik}(iof)$ in order to account for the difference between the actual measurement time $t_k=t_a+k\Delta t$ and the common observation time $t_B$. This transformation is performed, for each satellite "k", based on the ionosphere-free carrier phase observation $\phi_{P_k}{}^{ik}(iof)$ at time $t_a+k\Delta t$ and the ionosphere-free carrier phase observation $\phi_B{}^{ik}(iof)$ at time $t_B$. As schematically illustrated in FIG. 3, the single ionosphere-free additional pseudorange variables $p_{P_k}{}^{ik}(iof)$ referring to different satellites "k" are propagated to a common observation time $t_B$. In the embodiment of FIG. 3, additional observations at times $t_k=t_a+k\Delta t$ between two consecutive standard observation times $t_a$ and $t_b$ are propagated to the last out of these two standard observation times.

Here and in the following, it is assumed that all carrier phases are expressed in meters (what can be achieved by multiplying the accumulated number of cycles by the carrier wavelength).

The transformed pseudorange observation to a satellite is obtained by subtracting the difference between the carrier phase at the measurement time and the carrier phase at the standard observation time to the ionosphere-free additional pseudorange variable:

$$p_B{}^{ik}(t_B,iof)=p_{P_k}{}^{ik}(iof)+[\phi_B{}^{ik}(iof)-\phi_{P_k}{}^{ik}(iof)]$$

It can be observed that this transformation process is feasible whatever the user dynamics are, as far as the carrier phase tracking is maintained continuously on at least two frequencies out of the frequencies set $f_i \ldots f_n$. The corrected ionospheric-free pseudorange observable is named as the "final delta pseudorange observable" $p_B{}^i(t_b,iof)$ in the following.

In general, at each common observation time in which a complete standard observation is performed, there is an additional ionosphere-free pseudorange available per satellite for all satellites over the horizon if the value of $\Delta t$ is chosen to be sufficiently small.

Summarizing, the above described satellite navigation tracking method combines ionosphere-free standard carrier phase observables taken in a continuous carrier tracking loop using a low directional antenna (cf. FIG. 4) with ionosphere-free sequential pseudorange and ionosphere-free carrier phase observables taken sequentially for every satellite at different measurement times via a high-directional antenna feeding a separate code tracking loop.

The method according to the invention may employ real time control of the user velocity vector and user attitude, being it feasible in numerous rail, aviation and road application and in reference geodetic stations.

The additional ionosphere-free delta pseudorange observables representing the corrected pseudorange to the satellites over the horizon can be used to solve the standard user navigation equation with enhanced accuracy in case the position of the receiver as such was targeted (note that for many professional ground stations the position as such is well known, and is not the unknown).

The above described method can be employed in particular for GNSS ground tracking stations, for static highly demanding professional users, for any other application in which multipath-interference-free unambiguous observables are required, attitude and velocity are known. It is relevant to indicate that the sets of frequencies for the standard observations may partially or entirely overlap with the sets of frequencies employed for the additional observations at the times $t_a+k\Delta t$.

Figure 5:
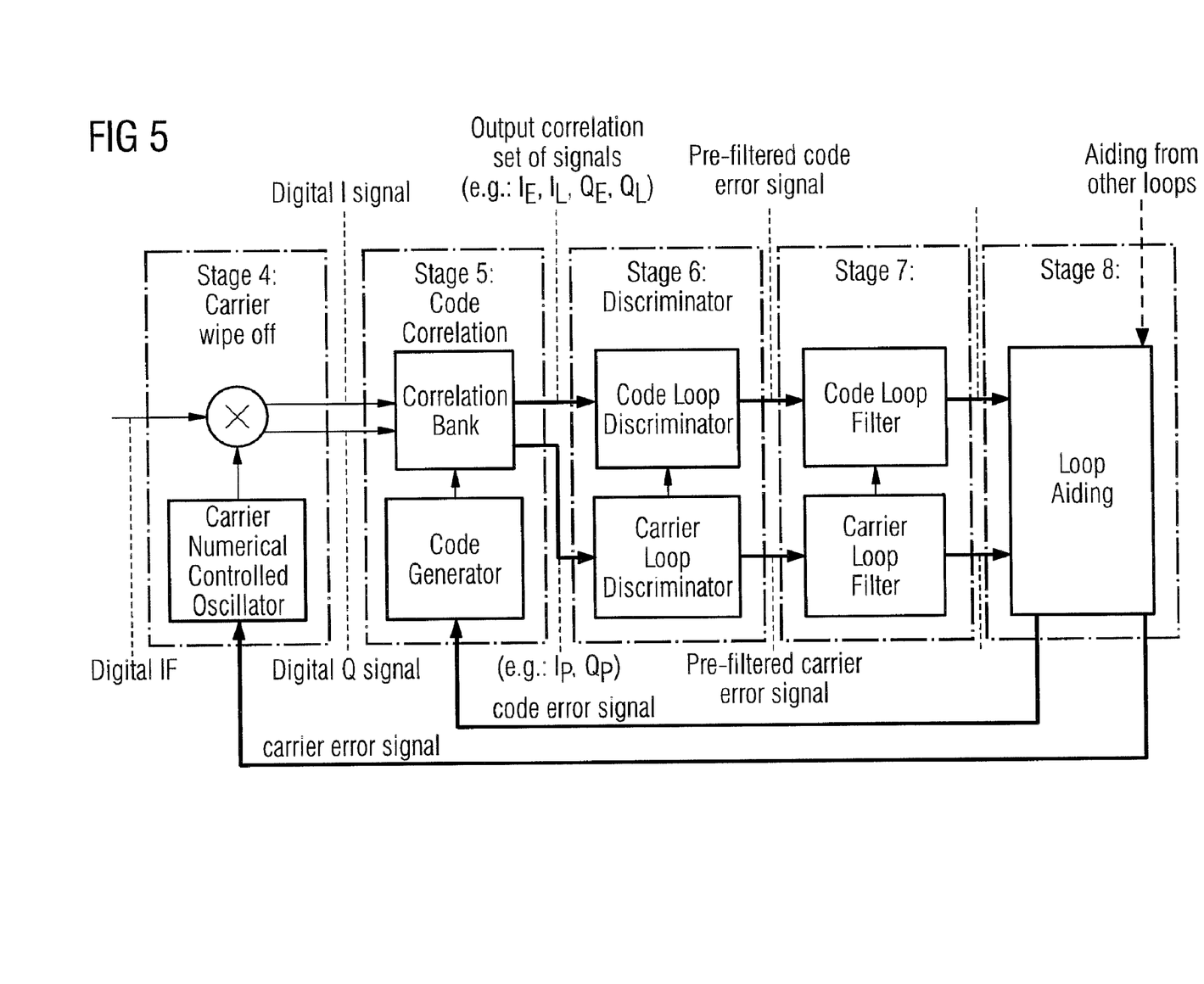
FIG. 5 is a diagram representing an embodiment of the digital receiver standard channel for use in a receiving station according to FIG. 4. This type of channel is used for continuous tracking.
Figure 6:
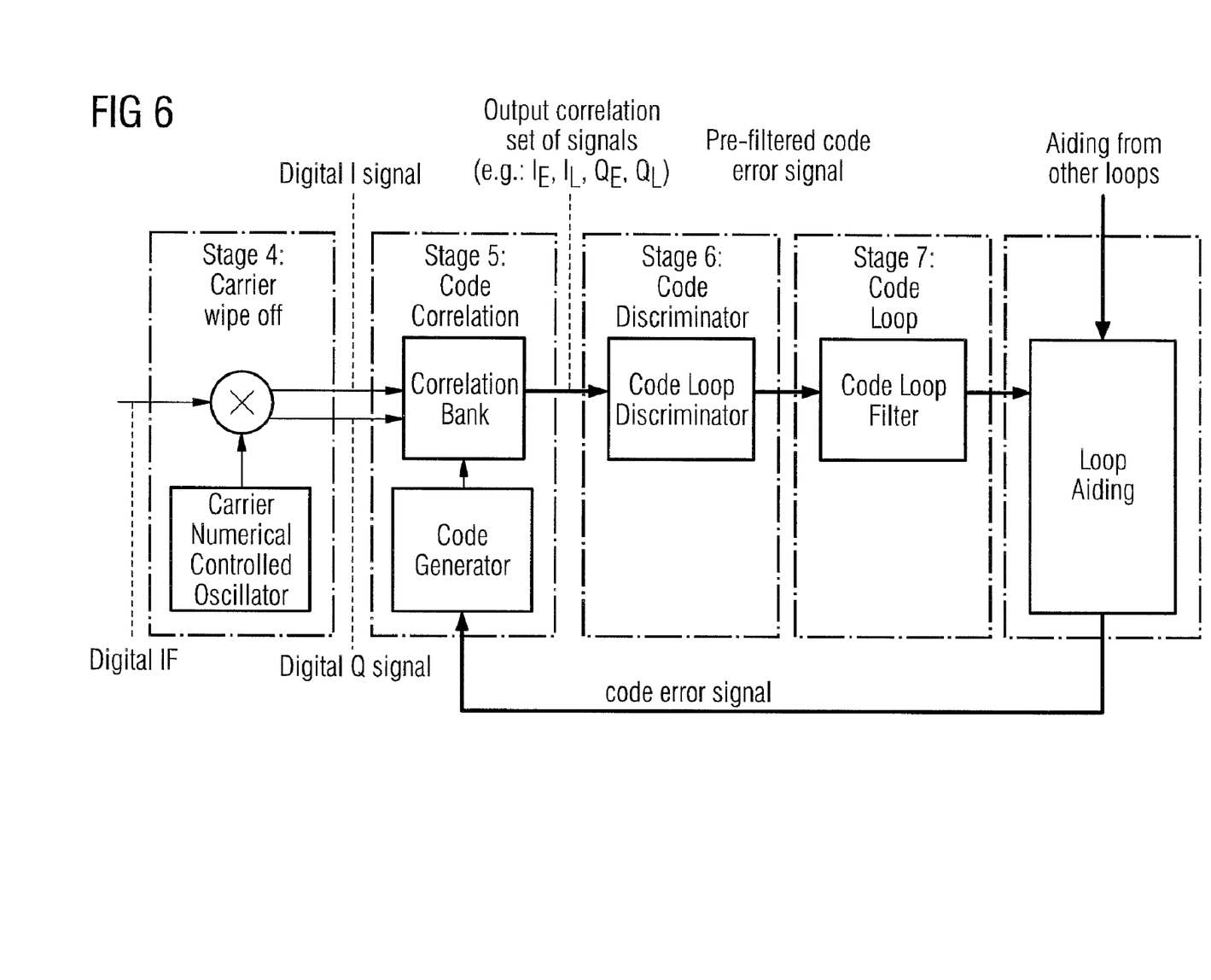
FIG. 6 is a diagram representing an embodiment of the digital receiver delta channel for use in a receiving station according to FIG. 4. This type of channel is used for sequential tracking.

An example of the structure of the receiving station implementing the invention will now be described with reference to FIGS. 4-6.

Figure 4:
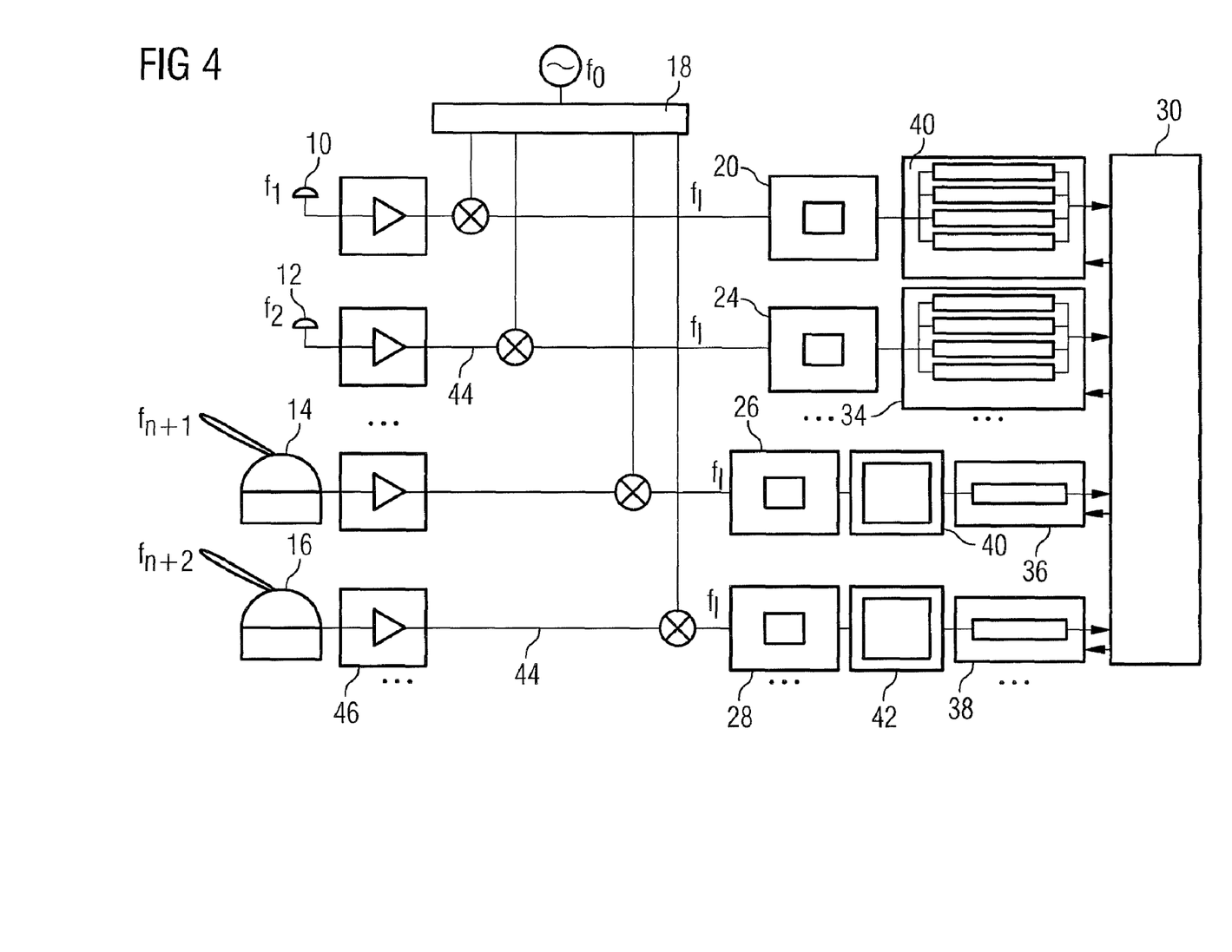
FIG. 4 is a schematic (and functional) representation of a receiving station suitable for implementing the method according to the invention.

FIG. 4 is a schematic functional representation of the receiving station according to the invention, which includes conceptually two non-directed channel antenna-subsystems 10, 12 and two directional antenna-subsystems 14, 16. The signals obtained from the antennae 10, 12, 14, and 16 are down-converted using the output of the frequency synthesizer 18. The down-converted signals are digitized using A/D converter 20, 24, 26, 28 and subjected to further signal processing.

Further units 32, 34, 36, 38 are used for disentangling the various channels, and antenna-processing units 40, 42 are used for constructing digitally the equivalent highly directive antenna pattern 14, 16.

The non-directional antennae 10, 12 target for the same polarization as the signals to be received and have a quasi-hemispherical gain module pattern and a fixed phase centre within the frequency band in which the satellites transmit. The gain module and the phase response might depend on the frequency, as far as this dependency is accurately predictable.

An ideal effective target radiation pattern for the directional antennae 14, 16 which targets for the same polarization as the signals to be received may have a pattern with one beam steerable in azimuth from 0° to 360° and elevation from 10° to 90°. Beam gain module and phase response should not depend significantly on the satellite azimuth or elevation within the relevant frequency band (or at least should be accurately predictable).

Both antenna-subsystems, the antenna-subsystem 1 with the non-directional antennae 10, 12 and the antenna-subsystem 2 with the directional antennae 14, 16 are connected to the same GNSS receiver system with the cables 44 which do not introduce any relevant propagation delay instability. Both antenna-subsystems, the antenna-subsystem 1 and the antenna-subsystem 2 can be integrated in one as far as the operating frequencies do not differ significantly.

Before reaching the frequency down-conversion stage 18, the signals obtained from the antennae 10, 12, 14, and 16 are pre-amplified and filtered in pre-amplification stages 46. It is noted that the down-conversion stage might use a common down-conversion frequency for the several carrier frequencies (depending on the frequency plan). In preferred embodiments of the invention, it is ensured that the down-conversion process preserves the coherence between the signals from the different antennae elements.

The antenna processing units 40, 42 may implement digital beam forming. In this case it is used, one channel per frequency, associated to a subset of antennae elements.

The units 32 and 34 comprise a bank of digital receiver standard channels for each of the frequencies $f_1 \ldots f_n$. Details of the channels are represented in FIG. 5. Within each bank, each individual channel is dedicated to a single satellite, and tracks continuously both its code-phase (by the code tracking loop) and its carrier-phase (by the phase tracking loop).

For the final delta pseudorange observations, and for each frequency $f_{n+1} \ldots f_{n+m}$, the separated digital receiver channels 36, 38 (delta channels) are considered. These channels are represented in detail in FIG. 6 and are dedicated exclusively to track sequentially the code-phase of each satellite in view. The code tracking loop is aided by the carrier tracking loops in the continuous tracking channels 32 and 34.

As shown in FIG. 4, the receiving station can be divided according to a functional criterion into a standard chain comprising the non-directional antennae 10, 12 and the units processing the signals therefrom and a delta chain corresponding to the antenna-subsystem 2 and comprising the directional antennae 14, 16 together with the units associated to these antennae.

The delta chain works sequentially by tracking during certain periods of time the signals on frequencies $f_{n+1} \ldots f_{n+m}$, and require of a rough estimation, within the beamwidth of the antenna-subsystem 2, of the satellite elevation and azimuth with respect to the receiver, in order to point appropriately the beam of the directional antenna.

Every time the delta chain tracks a satellite, an initial estimate of the delta pseudorange observable is needed to initiate the tracking. The initial estimate must be within the pull-in range of the tracking loop. When the delta chain tracks a satellite for the first time, the initial estimate has to be derived from a process similar to the acquisition of the standard tracking loop. The space search in delay and Doppler is very much narrowed thanks to the information from the standard chain, which is tracking the same satellite in a continuous mode, (although less accurately). The estimate of the tracking error of the pseudorange by means of the standard chain can be used to define the search space for acquisition in the delta chain (taking into account adequately the effects of the ionosphere).

Figure 7:
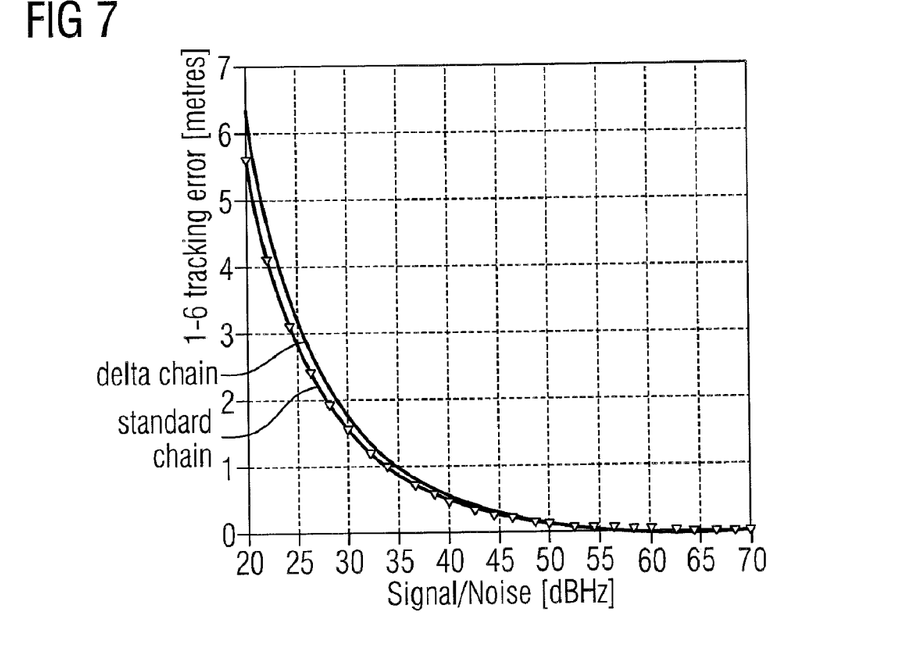
FIG. 7 is a graph showing the pseudorange tracking error due to thermal noise for a GPS L1 C/A signal as a function of the Signal to Noise ratio for a pre-selected and fixed code loop bandwidth.
Figure 8:
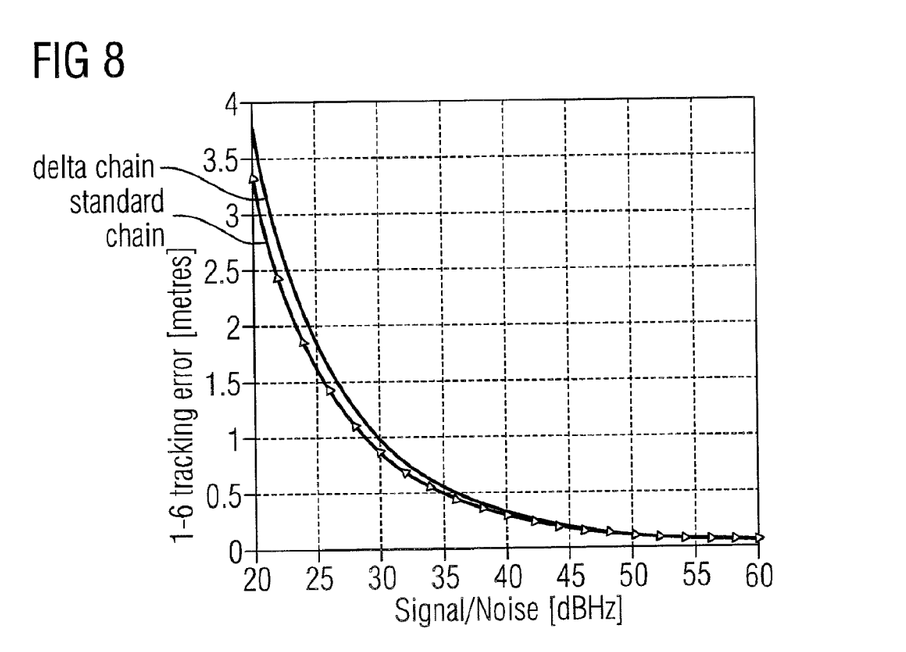
FIG. 8 is a graph showing the pseudorange tracking error due to thermal noise for a Galileo E1-C signal as a function of the Signal to Noise ratio, for a pre-selected and fixed code loop bandwidth.
Figure 9:
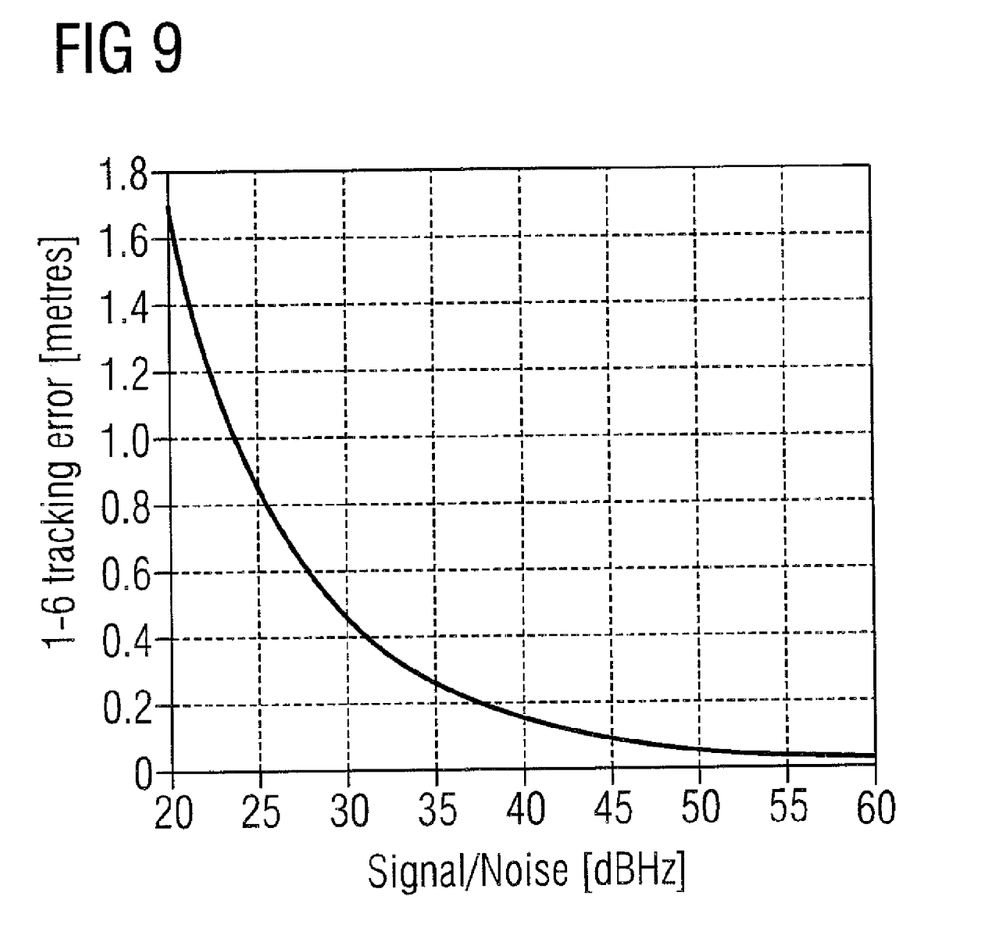
FIG. 9 is a graph showing the pseudorange tracking error due to thermal noise for a Galileo E5b-Q signal as a function of the Signal to Noise ratio, for a pre-selected and fixed code loop bandwidth.

The FIGS. 7-9 show the tracking error (excluding multipath) in a steady state of the delta chain for the three signals GPS L1 C/A, Galileo E1-C and Galileo E5b-Q under study, and assuming a common code loop bandwidth. A comparison between the 1 σ tracking error of the standard chain and the delta chain is shown in the following table:

| Signal | 1-σ tracking error, Standard Chain (cm) | 1-σ tracking error, Delta Chain (cm) |
|---|---|---|
| GPS L1 C/A | 53 | 3.0 |
| Galileo E1-C | 63 | 3.0 |
| Galileo E5b-Q | 27 | 1.9 |

According to FIGS. 7-9, the tracking error (excluding multipath) curves seem to be better for the standard chain configuration than for the delta chain when there are compared to the same signal/noise-ratio. This is due to higher early-minus-late-spacing of the discriminator in the delta chain. However, this does not contradict the fact that the delta chain has a better performance than the standard chain. This is because the delta chain will always work with much higher signal-to-noise-ratio than the standard chain, due to the high-gain antenna. In addition the delta chain may require a wider code loop bandwidth than that selected for the standard chain if the time between simultaneous observations is very low. The efficiency of the delta-chain, in terms of tracking error (excluding multipath), decreases when the time between simultaneous observations does.

The tracking error due to thermal noise and wideband interference in a steady state can be reduced from 208 cm to 8 cm for the GPS L1 C/A signal, from 347 cm to 9.1 cm for the Galileo E1-C signal, and from 244 cm to 1.9 cm for the Galileo E5b-Q signal (although the actual level of improvement depends on the time between simultaneous observations).

Regarding the multipath error for the standard chain, a typical long-tail distribution has been found. This distribution is typical when outliers appear and is caused by the high power of the multipath which, under certain conditions (in terms of phase and amplitude), lead to high errors. The multipath tracking error represented in FIG. 11 does not consider errors higher than 5 ns (excluded with the objective of not degrading the 1 σ tracking error statistics for the standard chain). Instead for the delta chain, the effect of the multipath is much smaller and the tracking error distribution is close to a Gaussian one. The tracking performances shown (for illustration purposes) in the Table below and in FIGS. 10-11, which are based on very strong diffuse multipath assumptions, shows a very clearly superior performance of the delta tracking method compared to the standard tracking method.

Figure 10:
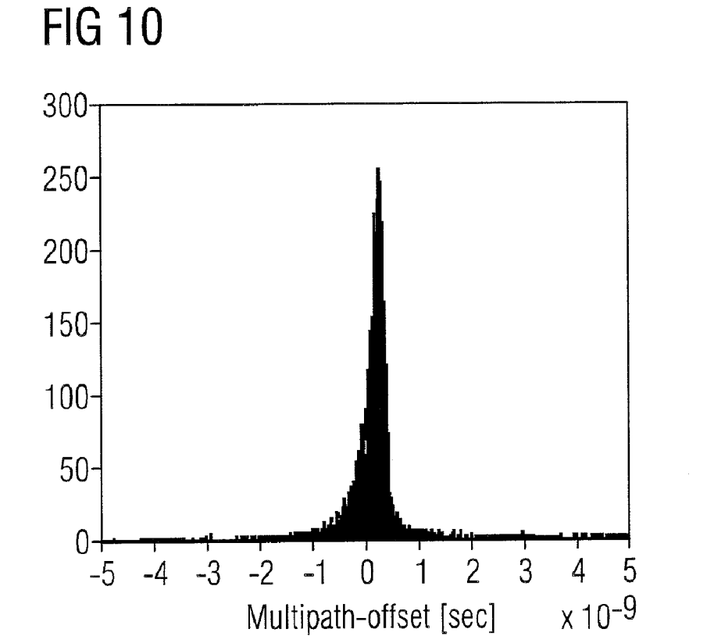
FIG. 10 is a multipath error distribution for the standard tracking chain (providing conventional observations) in the presence of thermal noise.
Figure 11:
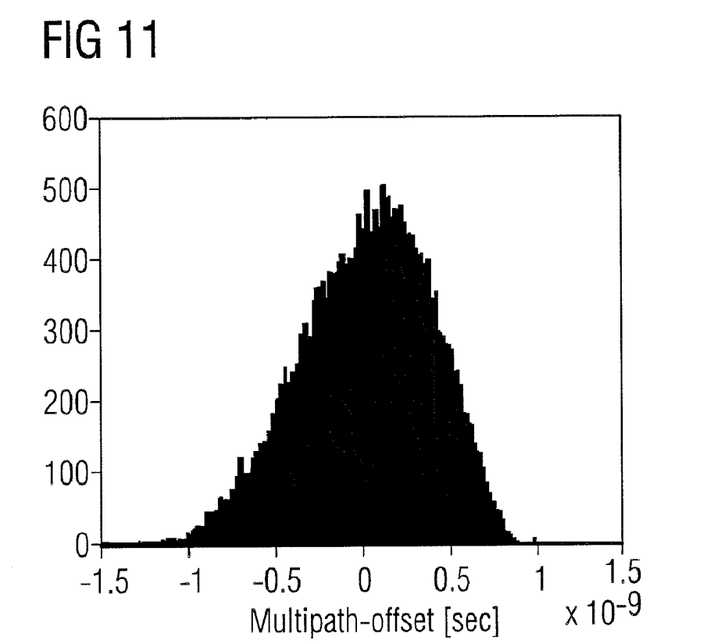
FIG. 11 is a multipath error distribution for the delta tracking chain (providing the additional synchronous observations) in the presence of thermal noise.

| Signal | 1-σ tracking error of standard chain (cm) | 1-σ tracking error of delta chain (cm) |
|---|---|---|
| GPS L1 C/A | 14.81 (4.5) | 1.11 (0.12) |
| Galileo E1-C | 15.65 (4.3) | 1.11 (0.13) |
| Galileo E5b-Q | 15.35 (4.3) | 1.11 (0.07) |

The delta tracking method makes use of sequential "one-way range unambiguous" observations which are by definition associated to different times. These observations are transformed by means of simultaneous "one-way range ambiguous" observations of the carrier phase into an equivalent set of simultaneous "one-way range unambiguous" observations referring to exactly the same time. The signals are corrected from ionosphere effects and are almost unaffected by multipath and interference when compared against the standard "one way range unambiguous" observables. The method according to the invention mitigates both the low and high temporarily correlated components of the multipath as well as the interference errors. The satellite tracking method according to the invention allows maintaining all the benefits associated to both simultaneous and sequential "one-way range unambiguous" observations.

A numerical example has illustrated that centimeter level accuracy can be obtained with the satellite navigation tracking method according to the invention.

The invention claimed is:

1. A navigation satellite tracking method comprising at least once determining one-way range unambiguous observations for each of a set of satellites in view, wherein standard tracking channels are permanently associated to each of the satellites, and wherein determining the one-way range unambiguous observations includes:
   determining one-way range unambiguous and one-way range ambiguous observations with a nearly-hemispherical antenna at a measurement time ($t_A$) for each satellite out of the set of satellites in view simultaneously;
   sequentially determining an additional one-way range unambiguous observation with a directive antenna at respectively different further measurement times ($t_A$ + kΔt), wherein:

one additional one-way range unambiguous observation is determined for each satellite out of the set of satellites, and additional tracking channels different from the standard tracking channels are used for this sequential determination;

sequentially determining an additional one-way range ambiguous observation with the nearly-hemispherical antenna at the further measurement times $t_A+k\Delta t$ for each satellite out of the set of satellites in view; and transforming, satellite per satellite, the additional one-way range unambiguous observations in one-way range unambiguous observations referred to a common future time ($t_B$), wherein this transformation is achieved by adding to each of the one-way range unambiguous observations the temporal evolution of the one-way range ambiguous observations of the respective satellite.

2. The navigation satellite tracking method of claim 1 wherein all observations, satellite per satellite, are determined for at least two frequencies to eliminate ionospheric effects.

3. The navigation satellite tracking method of claim 1 wherein each of the additional tracking channels is sequentially used for a predefined and fixed subset of satellites with at least two satellites.

4. The navigation satellite tracking method of claim 1 wherein the additional tracking channels are aided, in terms of line-of-sight dynamics compensation, by the standard tracking channels.

5. A receiving station for use in a satellite navigation system, the receiving station comprising:

a nearly hemispherical antenna;

a directive antenna; and circuitry and associated logic coupled to the nearly hemispherical antenna and to the directive antenna, wherein the circuitry and associated logic cause the receiving station to at least once determine one-way range unambiguous observations for each of a set of satellites in view, wherein standard tracking channels are permanently associated to each of the satellites, wherein determining the one-way range unambiguous observations includes:

determining one-way range unambiguous and one-way range ambiguous observations with the nearly-hemispherical antenna at a measurement time ($t_A$) for each satellite out of the set of satellites in view simultaneously;

sequentially determining an additional one-way range unambiguous observation with the directive antenna at respectively different further measurement times ($t_A+k\Delta t$), wherein:

one additional one-way range unambiguous observation is determined for each satellite out of the set of satellites, and additional tracking channels different from the standard tracking channels are used for this sequential determination;

sequentially determining an additional one-way range ambiguous observation with the nearly-hemispherical antenna at the further measurement times $t_A+k\Delta t$ for each satellite out of the set of satellites in view; and transforming, satellite per satellite, the additional one-way range unambiguous observations in one-way range unambiguous observations referred to a common future time ($t_B$), wherein this transformation is achieved by adding to each of the one-way range unambiguous observations the temporal evolution of the one-way range ambiguous observations of the respective satellite.

6. The receiving station of claim 5 wherein all observations, satellite per satellite, are determined for at least two frequencies to eliminate ionospheric effects.

7. The receiving station of claim 5 wherein each of the additional tracking channels is sequentially used for a predefined and fixed subset of satellites with at least two satellites.

8. The receiving station of claim 5 wherein the additional tracking channels are aided, in terms of line-of-sight dynamics compensation, by the standard tracking channels.

* * * * *